United States Patent [19]

Toyomura

[11] Patent Number: 4,843,591
[45] Date of Patent: Jun. 27, 1989

[54] ELECTRONIC EQUIPMENT WITH A PRINTER

[75] Inventor: Shigeru Toyomura, Kawasaki, Japan

[73] Assignee: Canon Kabushiki Kaisha, Tokyo, Japan

[21] Appl. No.: 63,759

[22] Filed: Jun. 17, 1987

Related U.S. Application Data

[63] Continuation of Ser. No. 851,281, Apr. 10, 1986, abandoned, which is a continuation of Ser. No. 367,721, Apr. 12, 1982, abandoned.

[30] Foreign Application Priority Data

Apr. 13, 1981 [JP] Japan ................... 56-55201

[51] Int. Cl.$^4$ .............................................. G06F 3/12
[52] U.S. Cl. ..................... 364/900; 364/930.4; 364/930.7
[58] Field of Search ........................... 364/200, 900

[56] References Cited

U.S. PATENT DOCUMENTS

| | | | |
|---|---|---|---|
| 3,984,662 | 10/1976 | Sorenson | 235/92 |
| 4,089,059 | 5/1978 | Miller et al. | 364/706 |
| 4,145,742 | 3/1979 | Olander, Jr. et al. | 364/709 |
| 4,283,723 | 8/1981 | Bickley et al. | 340/723 X |
| 4,373,194 | 2/1983 | Demke et al. | 364/900 |
| 4,396,977 | 8/1983 | Slater et al. | 364/188 |

*Primary Examiner*—Thomas M. Heckler
*Attorney, Agent, or Firm*—Fitzpatrick, Cella, Harper & Scinto

[57] ABSTRACT

Equipment with a printer, such as a desk top calculator with a printer, is provided with a special key for instructing printing of a graphic pattern. By depressing the special key, input numeric data and/or an operation result are printed in a graph such as a bar graph which represents the magnitude of the data.

31 Claims, 10 Drawing Sheets

FIG. 3A

| PRINT PATTERN | DATA CODE |
|---|---|
| ▫ | (100001) |
| ▫ | (100010) |
| ▫ | (100011) |
| ▫ | (100100) |
| ▫ | (100101) |

FIG. 3B

| PRINT PATTERN | DATA CODE | PRINT PATTERN | DATA CODE | PRINT PATTERN | DATA CODE |
|---|---|---|---|---|---|
| ▫ | (100001) | ▫ | (101011) | ▫ | (110101) |
| ▫ | (100010) | ▫ | (101100) | ▫ | (110110) |
| ▫ | (100011) | ▫ | (101101) | ▫ | (110111) |
| ▫ | (100100) | ▫ | (101110) | ▫ | (111000) |
| ▫ | (100101) | ▫ | (101111) | ▫ | (111001) |
| ▫ | (100110) | ▫ | (110000) | | |
| ▫ | (100111) | ▫ | (110001) | | |
| ▫ | (101000) | ▫ | (110010) | | |
| ▫ | (101001) | ▫ | (110011) | | |
| ▫ | (101010) | ▫ | (110100) | | |

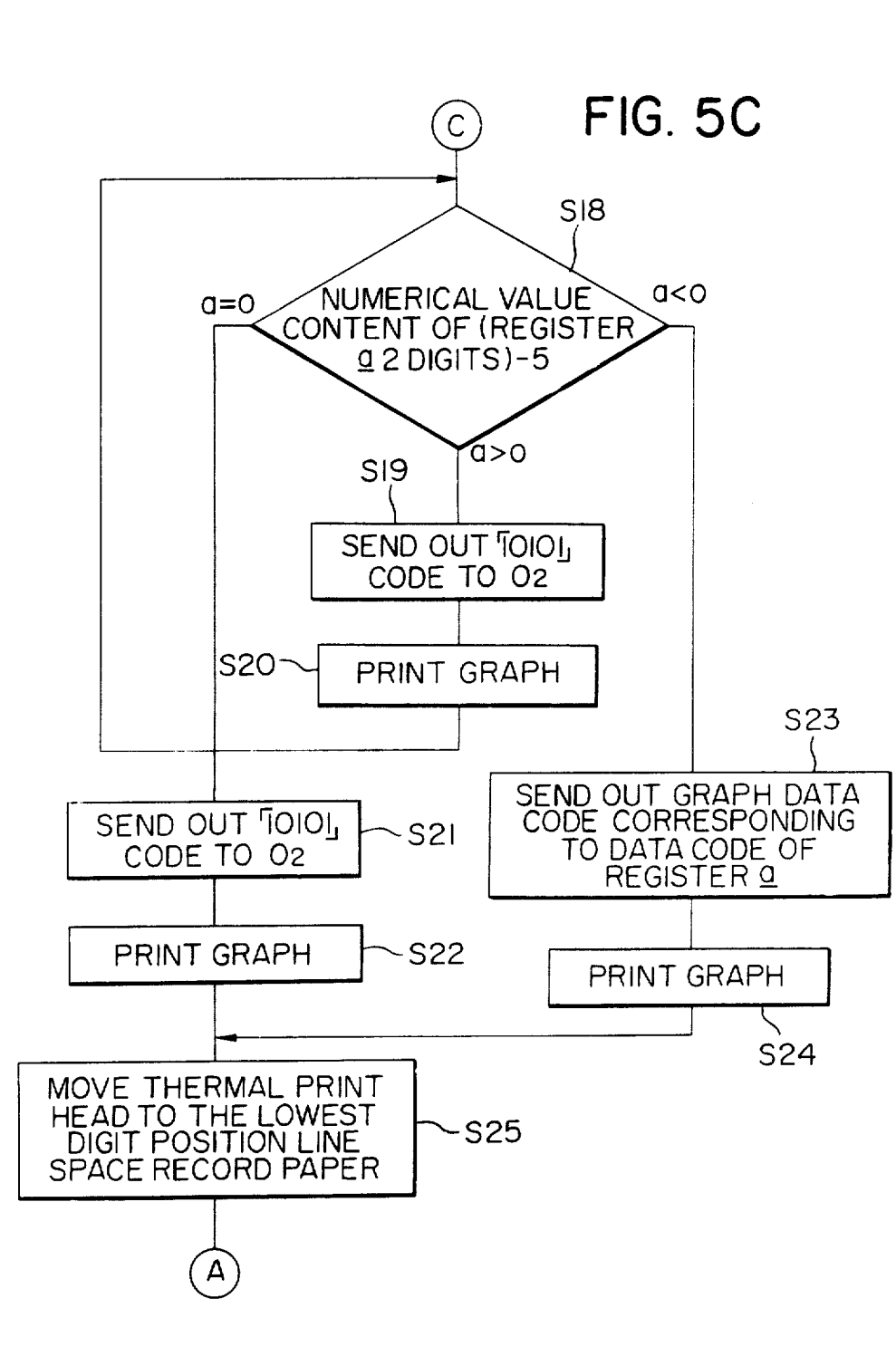

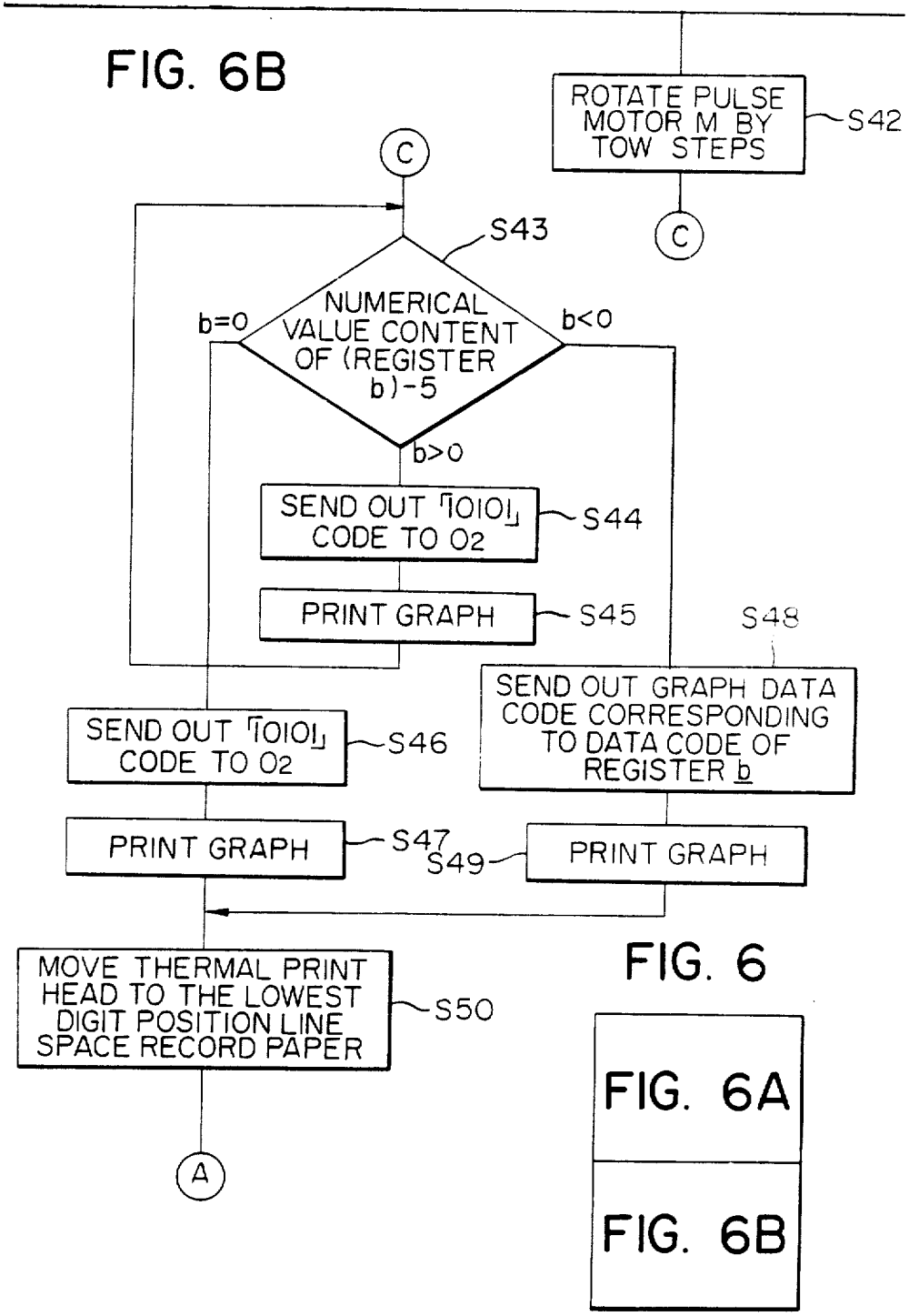

| FIG. 7A |
|---|
| FIG. 7B |

ELECTRONIC EQUIPMENT WITH A PRINTER

This application is a continuation of application Ser. No. 851,281, filed Apr. 10, 1986, now abandoned, which was a continuation of application Ser. No. 367,721, filed Apr. 12, 1982, now abandoned.

BACKGROUND OF THE INVENTION

1. Field of the Invention

The present invention relates to electronic equipment with a printer capable of graphically printing input numeric data and data processed based on the input numeric data.

2. Description of the Prior Art

In prior art printers used in electronic equipment such as desk top calculators, a mechanical printer having a printing type wheel, a thermal printer, and an ink jet printer which construct numerals, characters and symbols by dot printing are known. When a plurality of arithmetic operations are carried out by the desk top calculator with such a printer, it may be desired to graphically compare the magnitudes of the operation results. In such a case, an operator usually prepares a graph by himself or herself based on the operation results to compare the results. When a number of numeric data are to be compared, the operator also prepares a bar graph consuming much time.

SUMMARY OF THE INVENTION

It is an object of the present invention to provide an electronic equipment with a printer which can graphically print input numeric data and data processed based on the input numeric data by depressing a special key arranged on conventional electronic equipment with a printer.

It is another object of the present invention to provide electronic equipment with a printer which can print (or record) an exact graph of numeric data by setting in predetermined integer ratio between the numeric data and the number of dots of the graph.

It is a further object of the present invention to provide an electronic equipment with a printer which can print a graph in a non-print mode.

The above and other objects of the present invention will be apparent from the following description of the preferred embodiments of the present invention.

BRIEF DESCRIPTION OF THE DRAWINGS

FIGS. 3A and 3B show print patterns used in the graphic printing shown in FIGS. 1A, 1B, 1C and 2.

FIGS. 6A and 6B, arranged as shown in FIG. 6, show flow charts for the printing shown in FIG. 1A.

DETAILED DESCRIPTION OF THE PREFERRED EMBODIMENT

FIGS. 1A, 1B and 1C and 2 show keying operations of the electronic equipment with the printer of the present invention and examples of graphic printing (e.g. bar graphs) by the keying operations. A symbol P denotes a record paper and charts shown on the left of the record papers show keying sequences.

Figure 1A:
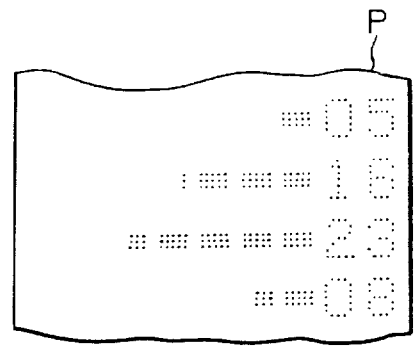
FIGS. 1A, 1B, 1C and 2 show examples of print by electronic equipment with a printer of the present invention.

FIG. 1A shows an example of a print of a graph based on input numeric data. In the keying operation, a numeric key [5] is first depressed and then a graphic print key [g] instructing the graphic printing of the numeric data is depressed. The numeric data "5" is printed on the record paper at a lowest order position with a 5 dots (lateral) × 7 dots (longitudinal) pattern, and "0" is printed at a next higher order position with a 5 × 7 dots pattern with a space of 2 dots between "5" and "0". Then, a bar graph of a 5 dots (lateral) × 3 dots (longitudinal) pattern representing the input numeric data is printed and spaced by 2 dots. In this print example, three dots in a longitudinal line correspond to the numeral "1". Accordingly, the graphic pattern represents the numeral "5".

Then, keys [1], [6] and [g] are depressed, and the numeral "16" is printed in the same manner. A bar graph pattern of 5 dots (lateral) × 3 dots (longitudinal) representing the numeral "5" is printed at a next higher order position, and a bar graph pattern of 5 × 3 dots is also printed at each of the still next higher order position and the further higher order position with spaces of 2 dots therebetween. A bar graph pattern of 1 dot (lateral) × 3 dots (longitudinal) is printed at the next higher order position. Thus, a bar graph pattern of 16 dots (lateral) × 3 dots (longitudinal) representing the numeral "16" is printed. The keying operations [?], , and [8], [g] are similarly handled.

Figure 1B:
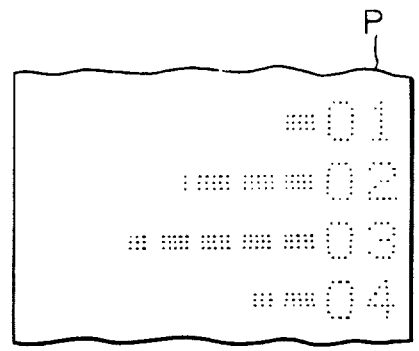

In FIG. 1B, instead of printing the numerals representing the bars on the right hand of the record paper as is the case of FIG. 1A, code numbers are printed. By depressing the keys in the sequence shown on the left hand of FIG. 1B, the bar graphs corresponding to the code numbers 01-04 are printed. A key [N] is used to enter the code number. When the keying operation as shown in FIG. 1A is carried out after depressing the key [N], the numeric data is not printed out in this example.

Figure 1C:
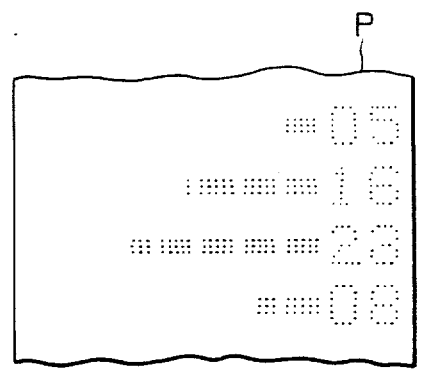

FIG. 1C shows an example of print printed by a desk top calculator with a printer, in which a ratio calculation is performed with a printer being set in a non-print mode by a print mode switch and a result of the calculation is printed by a bar graph. As an example of the ratio calculation, let us consider a calculation of 4÷80%. The keys [4], [÷], [8], [0], [%] are depressed in this order and then the key [g] is depressed. As a result, the calculation result "5" and the bar graph representing the numeral "5" are dot printed as shown in FIG. 1C. The other ratio calculations can be similarly handled and the calculation result data are represented by the bar graphs.

Figure 2:
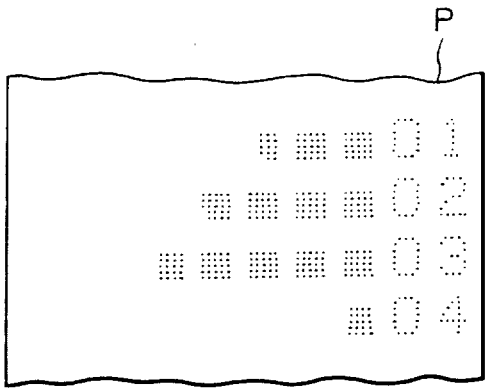

FIG. 2 shows an example of printing by another embodiment of the present invention in which the number of dots of the bar graph is equal to the numeric data. By specifying any desired code number by depressing the key    shown in FIG. 1B and then depressing the keys , , [g], a bar graph of 64 dots which is equal in number of dots to the numeric data "64" is printed.

FIGS. 3A and 3B show print patterns used in the bar graph print. FIG. 3A shows the print patterns used in the bar graph print shown in FIGS. 1A-1C. The longitudinal 3 dots correspond to the numeral "1". Five different print patterns are used. The print patterns are represented by 5-bit data codes "10001 - 10101" as shown in FIG. 3A.

FIG. 3B shows the print patterns used in the bar graph print shown in FIG. 2. One dot corresponds to the numeral "1" and 25 different print patterns are used. The print patterns are represented by 6-bit data codes "100001 -111001" as shown in FIG. 3B.

Figure 4:
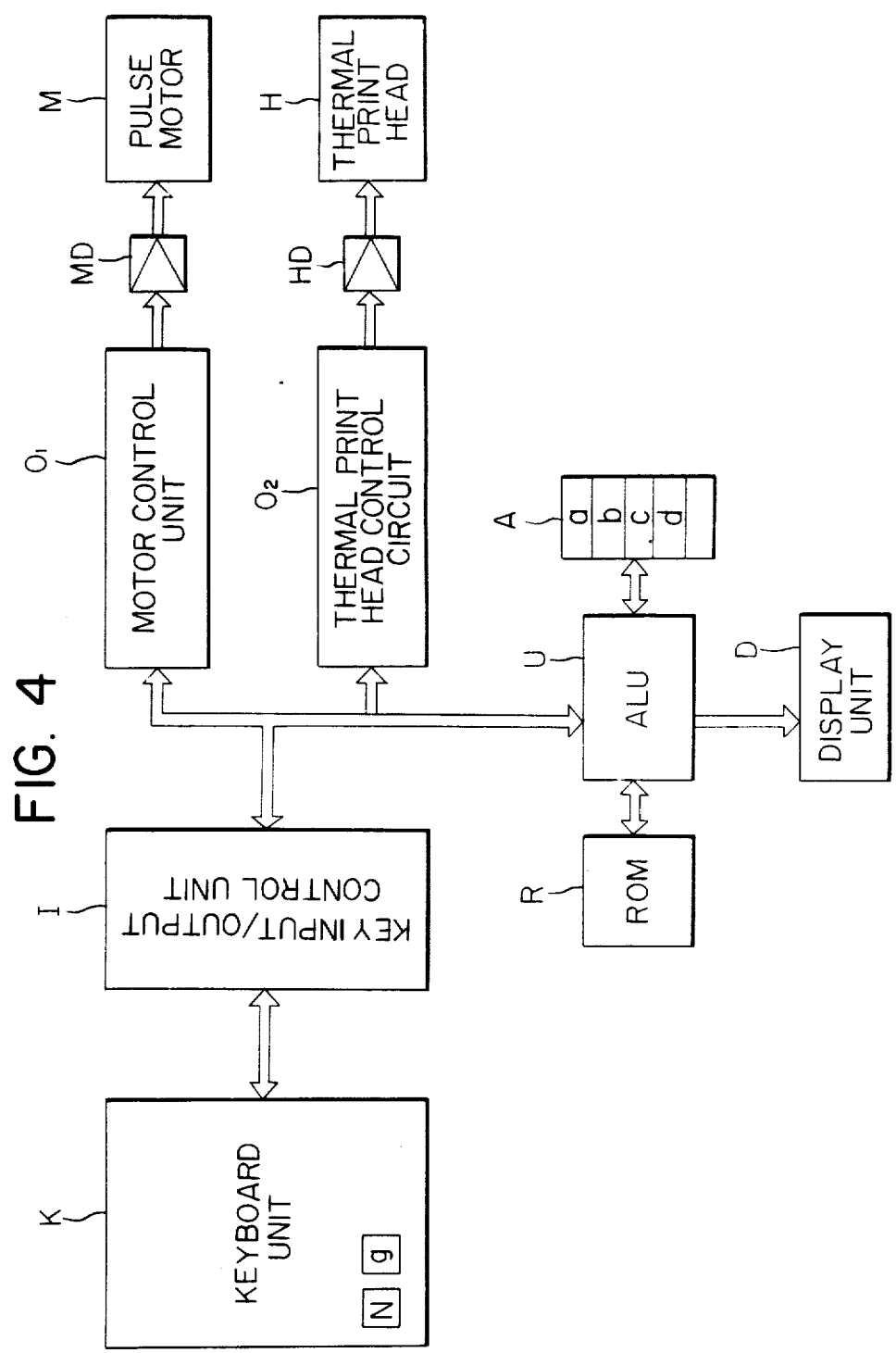
FIG. 4 shows a block diagram of electronic equipment with printer of the present invention.

FIG. 4 shows a block diagram of one embodiment of a desk top calculator with a printer in accordance with the present invention for printing the bar graph shown above.

In FIG. 4, K denotes a keyboard unit for entering key input information such as numerals and functions and has numeric keys [0]-[9], function keys [+], [-], [×], [÷], [=], a print mode switch for specifying a print mode or a non-print mode, a graphic print key [g] for instructing printing of a bar graph and a code number specifying key [N]. I denotes a key input/output control unit which supplies a key signal to the keyboard unit K and receives a key signal from the keyboard unit K to determine which key is depressed. U denotes an arithmetic logic unit (ALU) which carries out addition, subtraction, multiplication and division operations in response to the depression of the function keys of the keyboard unit K. A denotes a stack of registers which stores numeric data entered by the keys, results of the operations and memory data. It is usually comprised of a random access memory (RAM). R denotes a memory which stores control programs corresponding to the keying operations of the keyboard unit K. The arithmetic operations and the output controls are carried out under the control of the control programs. The memory R comprises a read-only memory (ROM) and a ROM decoder for decoding the programs. D denotes a display unit which displays the input numeric data and the operation results in response to a signal from the ALU U. H denotes a thermal print head having heat generating elements arranged in a 7-dots line. By supplying a current to the thermal print head H, dots are printed on a heat sensitive record paper. M denotes a pulse motor for driving the thermal print head H laterally. When one line of print has been completed, the print paper is line-spaced by mechanical means. $O_2$ denotes a thermal print head control circuit for driving the thermal print head H. It comprises a character generator for converting the 5-bit or 6-bit data code supplied from the ALU U to the print pattern shown in FIG. 3. $O_1$ denotes a pulse motor control circuit for driving the pulse motor M. It generates one pulse at a time to drive the thermal print head H laterally. MD denotes a drive circuit for current-amplifying the signal from the pulse motor control circuit $O_1$ to drive the pulse motor M. HD denotes a drive circuit for current-amplifying the signal from the thermal print head control circuit $O_2$ to drive the thermal print head H.

Figure 5A:
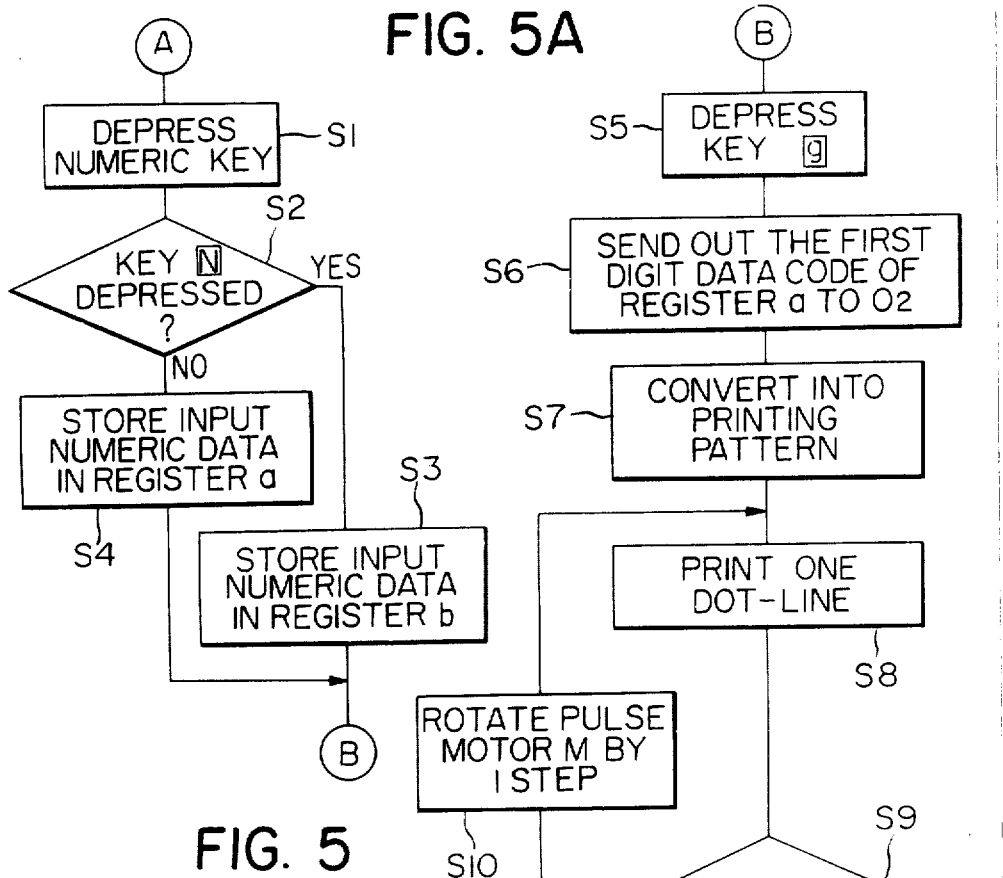
FIGS. 5A, 5B and 5C, arranged as shown in FIG. 5, show flow charts for the printing shown in FIGS. 1A and 1B.
Figure 5:
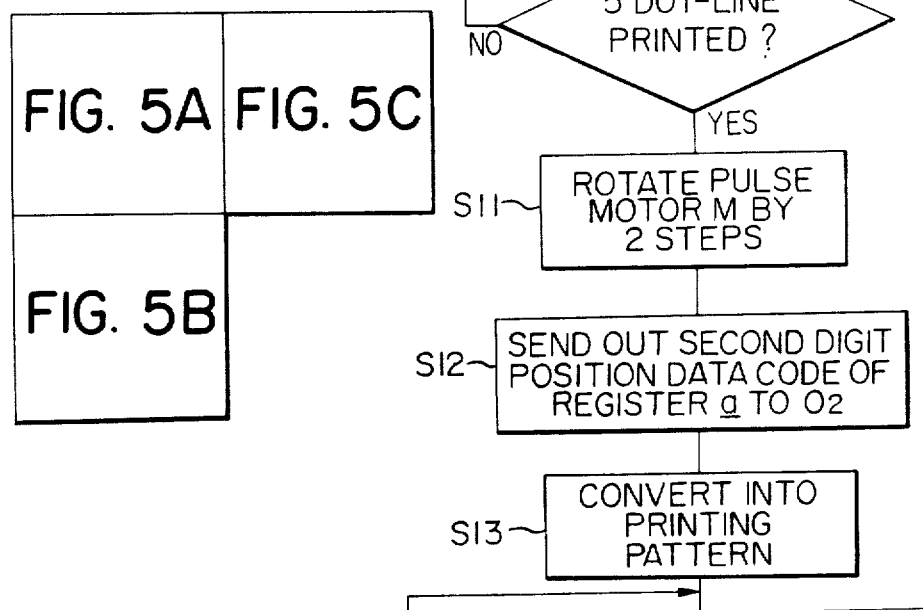
Figure 5B:
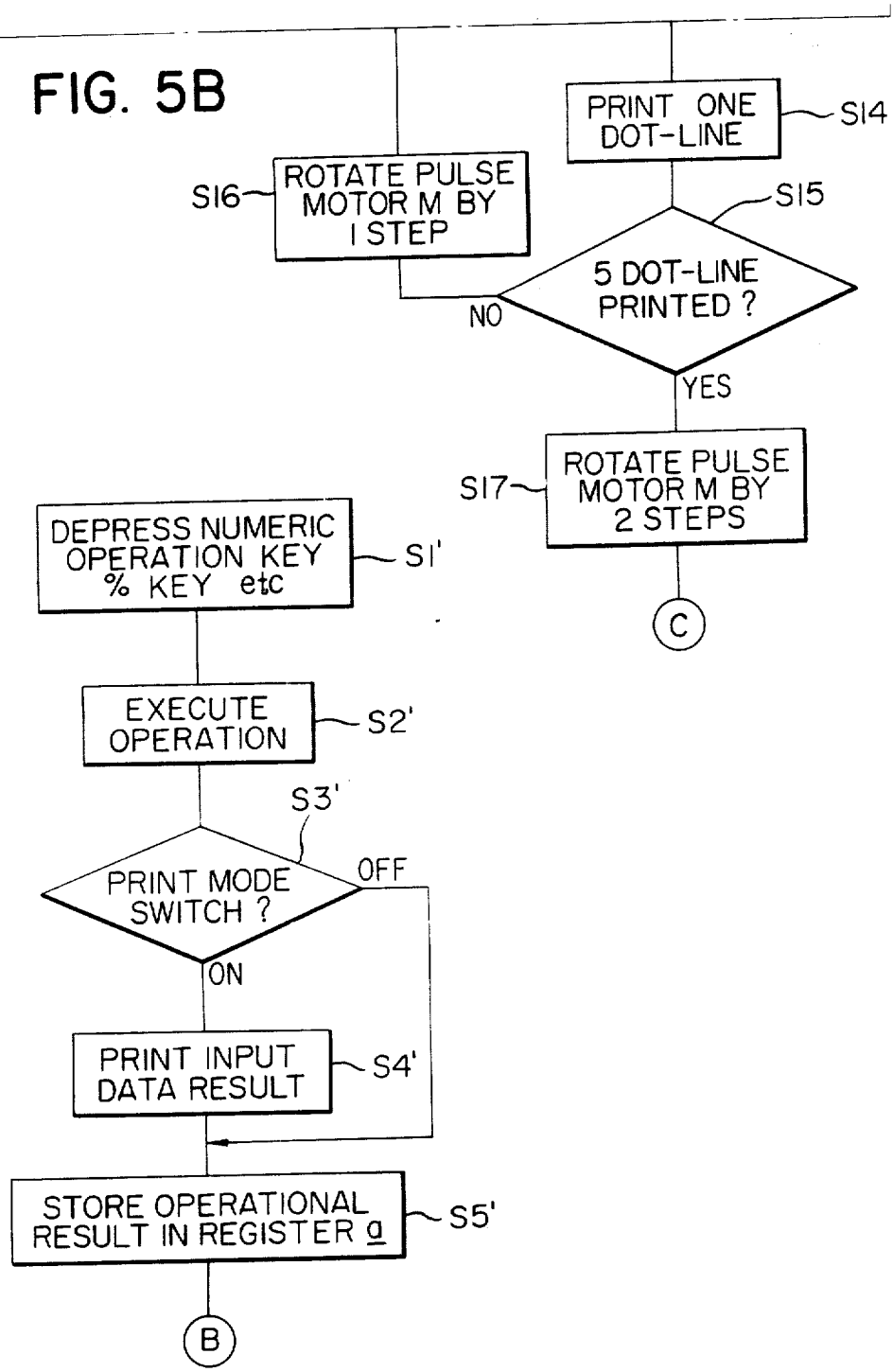
Figure 6A:
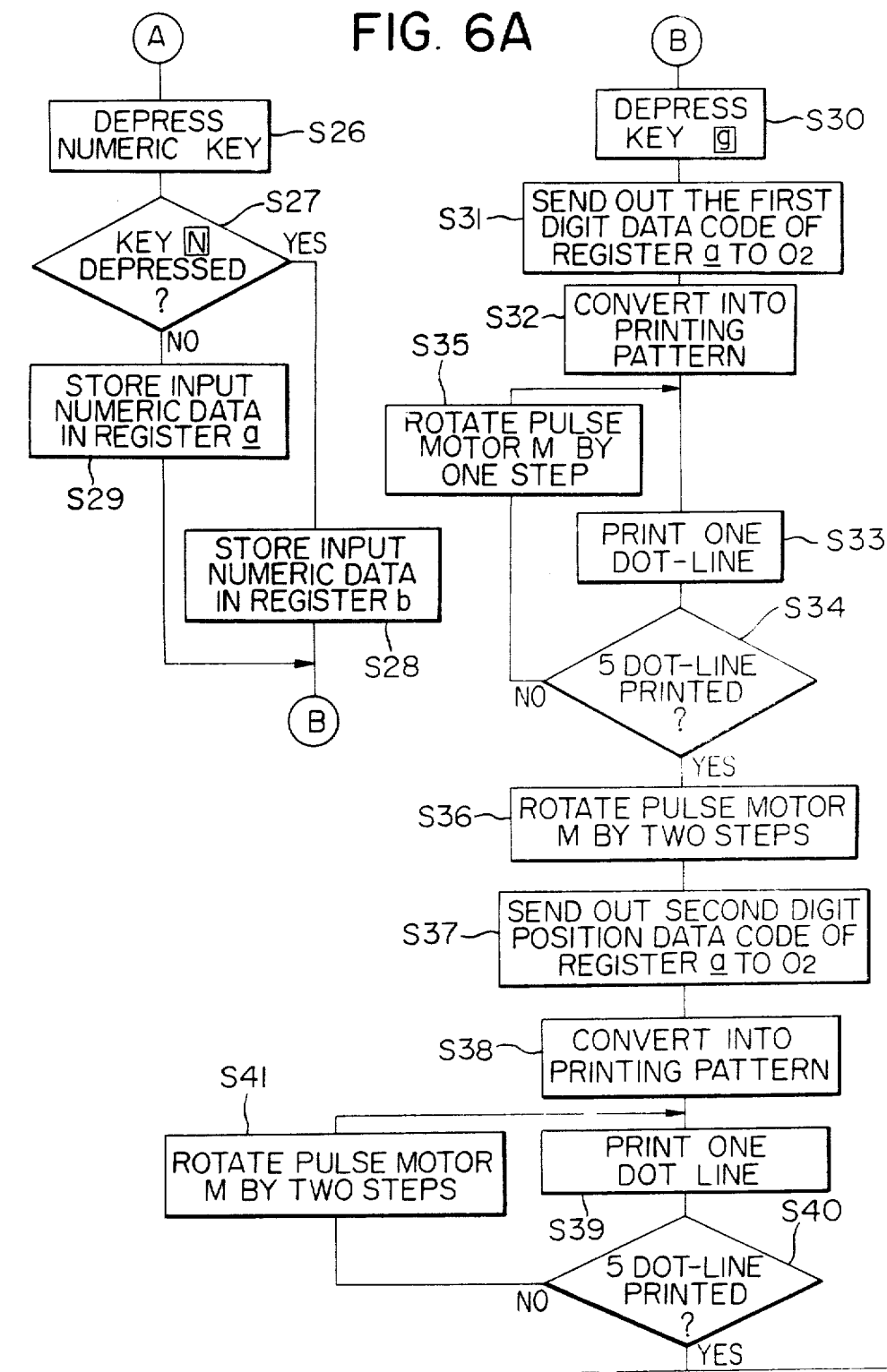
Figure 7A:
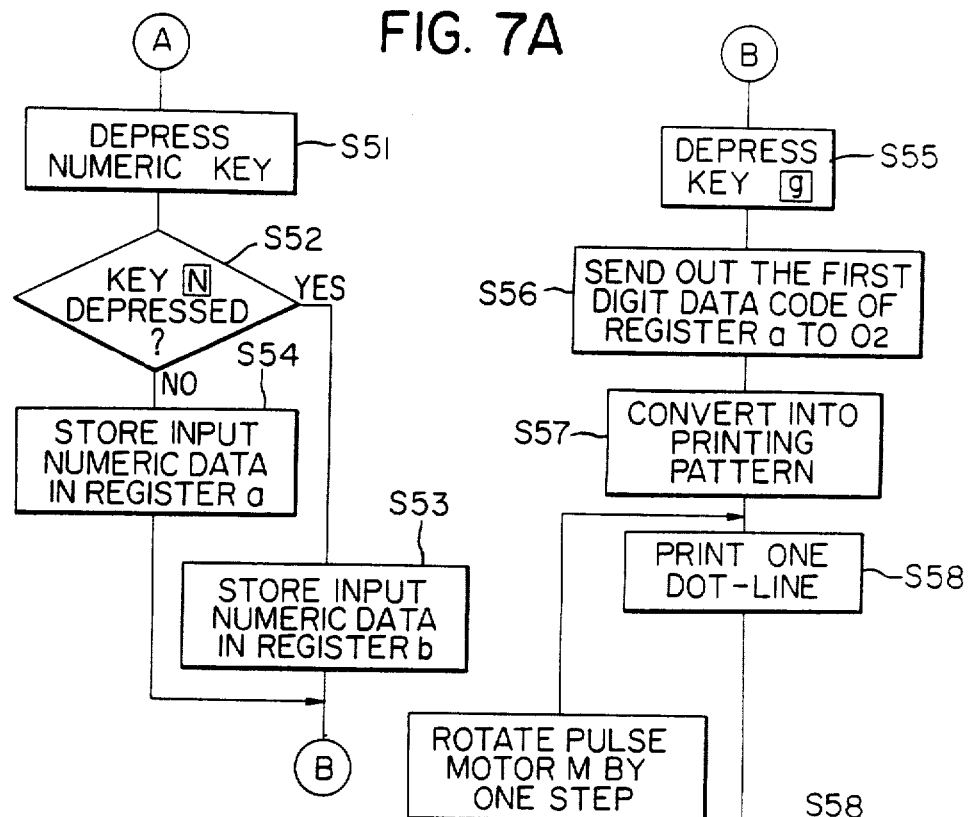
FIGS. 7A and 7B, arranged as shown in FIG. 7, show flow charts for the printing shown in FIG. 2.
Figure 7:
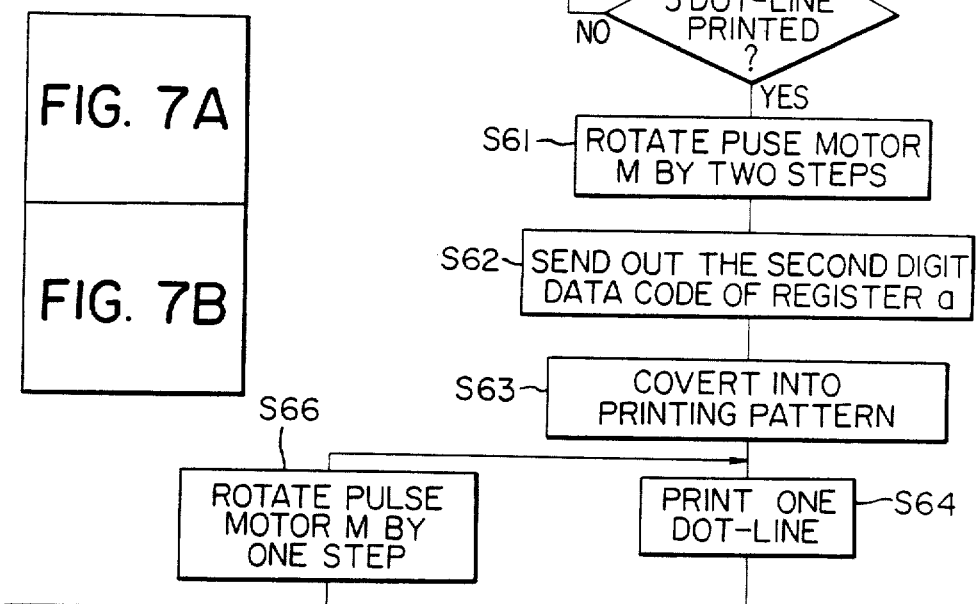
Figure 7B:
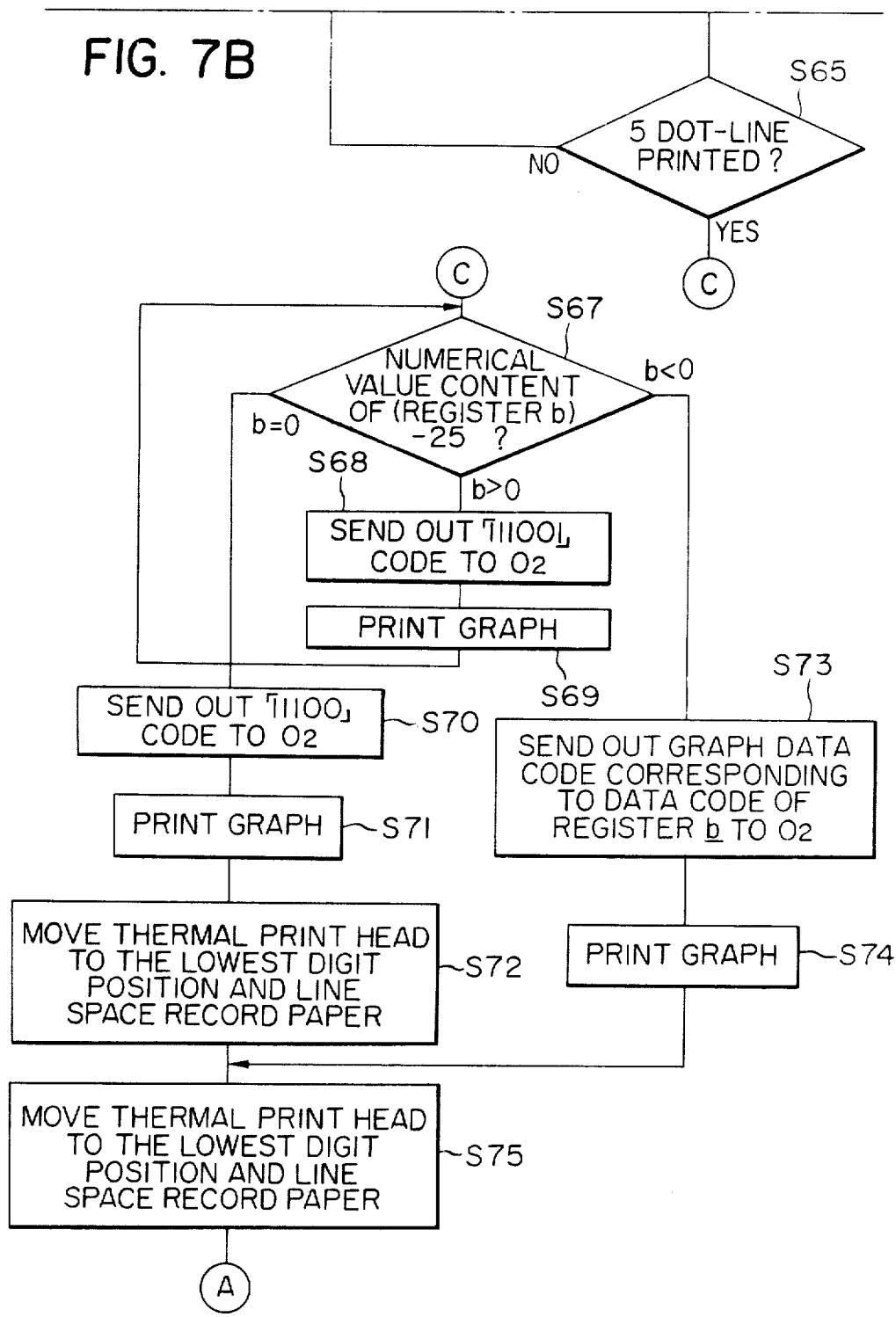

The operation of the desk top calculator constructed as shown in FIG. 3 and having a printer is now explained for the graphic printing as shown in FIGS. 1A-1C and 2 with reference to flow charts shown in FIGS. 5, 6 and 7.

The graphic print shown in FIG. 1A is first explained with reference to the flow chart shown in FIG. 5. When the numeric key [5] on the keyboard unit K is depressed, a corresponding key signal is detected by the key input/output control unit I, which transmits the signal to the ALU U. The ALU U determines that the key signal represents the numeral "5" and loads a data code "0101" corresponding to the numeric key [5] to a register a of the register stack A (steps S1→S2→S4). The display unit D now displays "5". When the graphic print key [g] is depressed (step S5), the keyboard unit K supplies a corresponding key signal to the key input/output control unit I. The key input/output control unit I discriminates the key signal and supplies the discrimination signal to the ALU U. The ALU U thus reads out the data code stored at the first digit position of the register a of the register stack A and sends it to the thermal print head control circuit $O_2$ (step S6). The thermal print head control circuit $O_2$ converts the code to the print pattern for "5" with the character generator (step S7) and sends the dot print output to the thermal print head drive circuit HD. The heat generating elements of the thermal print head H are driven by the thermal print head drive circuit HD so that the dot pattern of the numeral "5" is printed on the record paper. The dot pattern printing is completed by printing five dot-lines. When the printing of one dot-line is first completed (step S8), the ALU U checks if the five dot-lines have been printed (step S9). Since the five dot-lines have not been printed at this time, the ALU U sends a signal to the pulse motor control circuit $O_1$ to rotate the pulse motor M by one step. The pulse motor control circuit $O_1$ controls the pulse motor drive circuit MD to rotate the pulse motor M by one step so that the thermal print head H is moved to the next dot-line (step S10). The thermal print head drive signal for the second dot-line is similarly supplied from the thermal print head control circuit $O_2$ to print the desired pattern. The above operation is repeated for each of the five dot-lines to print the numeric pattern "5".

Then, in order to leave a space to the next digit position, the pulse motor control circuit $O_1$ controls the pulse motor drive circuit MD to rotate the pulse motor M by two steps (step S11) so that a space equal to 2-dots is formed. Then, the ALU U reads out the data code corresponding to the numeral "0" from the second digit position of the register a of the register stack A and sends it to the thermal print head control circuit $O_2$ (step S12). The subsequent steps are identical to those described above. The code is converted to the print pattern for "0" by the character generator of the thermal print head control circuit $O_2$ and the print pattern is printed in the five dot-lines to print the numeric pattern "0" (Steps S14→S15→S16 are repeated five times). Then, in order to leave a space to the graphic print position, the pulse motor control circuit $O_1$ controls the pulse motor drive circuit MD to rotate the pulse motor M by two steps (step S17) to form a space equal to 2-dots. Then, the graphic print operation starts.

The ALU U first reads out the data code stored in the register a of the register stack A and determines if it is smaller than, larger than, or equal to "5" (step S18). Since it is equal to "5" in this example, the ALU U sends a 5-bit graphic data code "10101" to the thermal print head control circuit $O_2$ (step S21). The thermal print head control circuit $O_2$ converts the data code to the dot pattern shown in FIG. 3A by the character generator and cooperates with the pulse motor control circuit $O_1$ to print the dot pattern on the record paper (step S22). Then, the pulse motor M is rotated to move the thermal print head H to the lowest digit position so that the record paper is automatically line spaced (step S25).

In the keying operation of [1], [6], [g] for the next line, the similar steps to those described above are carried out to print the numerals "16". In the graphic printing for this case, since each digit position can print up to 5, the graphic pattern of the 5-bit data code "10101" is printed three times in the steps S18→S19→S20, that is, the graphic patterns are printed in three digit positions (step S20). For the remaining 1[=16−(5×3)] dot pattern, the 5-bit data code "10001" corresponding to the 1 dot (lateral)×3 dots (longitudinal) pattern is sent to the thermal print head control circuit $O_2$ to print the dot pattern on the record paper (steps S23–S24). Then, the pulse motor M is rotated to move the thermal print head H to the lowest digit position so that the record paper is automatically line spaced (step S25). In other words, the device iteratively converts numeral 16 input into the device to a bar graph pattern which represents the numeric data by iterating data code "10101" three times and printing a 5 by 3 dot pattern three times and produces a final iteration of data code "10001" which causes a 1×3 dot pattern to print, as illustrated in FIG. 1A.

In the graphic printing for the keying operations of [2],[3],[g] and [8], [g], the similar operations are carried out to print the graphic patterns as shown in FIG. 1A.

The operation for the graphic print of FIG. 1B is now explained with reference to the flow chart shown in FIG. 6. When the keys [1] and [N] of the keyboard unit K are depressed (step S26), the corresponding key signals are detected by the key input/output control unit I, which transmit these signals to the ALU U. The ALU U checks the key signals to determine if the key [N] was depressed after the numeric key had been depressed (step S27). Since the key [N] was depressed in this example, the data code corresponding to the input numeric data "1" is stored in the register a of the register stack A (step S29). When the numeric key [5] is next depressed, the operation described above is carried out so that the data code corresponding to the numeral "5" is stored in the register b of the register stack A (steps S26→S27→S28). When the key [g] is next depressed (step S30), the data code stored in the register a is sent to the thermal print head control circuit $O_2$ to print "01". The print operation for the numerals "01" is similar to that for the numeral "5" of FIG. 1A and hence the explanation thereof and the explanation of the flow chart are omitted here. In graphic printing, the ALU U reads out the data code stored in the register b of the register stack A and checks if the data code is smaller than or larger than or equal to "5" (step S43). Since the data code is equal to "5" in this example, the 5-bit graphic data code "10101" is sent to the thermal print head control circuit $O_2$ to print the graphic pattern (steps S48→S49). In the other graphic printing operations by the keying operations shown in FIG. 1B, the similar operations to those described above are carried out although they are not explained here.

The operation of the graphic printing of FIG. 1C is now explained with reference to the flow chart shown in FIG. 5. For the keying operation of [4],[−],[8],[0], [%], the arithmetic operation is carried out by the ALU U and the registers a, b and c of the register stack A. By setting the print mode switch on the keyboard unit to a non-print mode, the print operation is not carried out. This control is well known in conventional desk top calculators and hence it is not explained here. When the key [%] is depressed and the operation result "5" is calculated, it is stored in the register a (steps S1′→S2′→S3′→S5′). The operation result "5" is displayed on the display unit D. When the key [g] is next depressed, the graphic printing of the content "5" of the register a of the register stack A is carried out because the ROM R is so programmed that actuation of the key [g] initiates the print operation even in the non-print mode of the print mode switch. The printing operations by the keying operation of [1],[2],[.],[8],[−],[8],[0], [%], [g] and other keying operations are carried out in the similar manner so that the print as shown in FIG. 1C is printed out. The operations after the depression of the key [g] are identical to those of FIG. 1A and hence they are not explained here.

The operation of the graphic printing of FIG. 2 is now explained with reference to the flow chart shown in FIG. 7. When the keys [1] and [N] of the key board unit K are depressed (step S51), the corresponding key signals are detected by the key input/output control unit I, which transmits the key signals to the ALU U. The ALU U checks the key signals to determine if the key [N] was depressed after the numeric key had been depressed (step S52). Since the key [N] was depressed in this example, the data code corresponding to the input numeral "1" is stored in the register a of the register stack A. When the numeric keys [6] and [4] are next depressed, the operation described above is carried out so that the data code corresponding to the numerals "64" is stored in the register b of the register stack A (steps S51→S52→S53). When the key [g] is next depressed (step S55), the data code stored in the register a is sent to the thermal print head control circuit $O_2$ to print "01". The printing operation for the numerals "01" is similar to that for the numeral "5" in FIG. 1A and hence the explanation thereof and the explanation of the flow chart are omitted here. In the graphic printing, the ALU U reads out the data code corresponding to the numerals "64" stored in the register b of the register stack A and checks if the data code is smaller than or larger than or equal to "25" (step S67). Since the data code is "64" in this example and larger than "25", the 6-bit graphic data code "111001" is sent to the thermal print head control circuit $O_2$ (step S68). The thermal print head control circuit $O_2$ converts the data code to the dot pattern shown in FIG. 3B by the character generator and cooperates with the motor control circuit $O_1$ to print out the dot pattern on the record paper (step S64). In the present graphic printing, one digit position can print up to 25 dots corresponding to numeric data "25". Accordingly, the above operation is repeated so that graphic printing for "50" of "64" is completed (steps S67→S68→S69). The ALU U then checks if the unprinted "14" is smaller than or larger than or equal to "25" (step S67). Since it is smaller than "25" in this example, the 6-bit data code "101110" corresponding to the numerals "14" is sent to the thermal print head control circuit $O_2$ (step S73). The thermal print head control circuit $O_2$ converts the data code to the dot pattern shown in FIG. 3B by the character generator and cooperates with the pulse motor control circuit $O_1$ to print out the dot pattern on the record paper (step S74). Then, the pulse motor M is rotated to move the thermal print head H to the lowest digit position so that the record paper is automatically line spaced. The other graphic printing of FIG. 2 are carried out in the same manner.

As described hereinabove, according to the present invention, the special key for instructing graphic printing is added to conventional electronic equipment with the printer to enable the printing of the bar graph by depressing the special key. Accordingly, several numeric data can be graphically compared. By selecting a predetermined integer ratio between the numeric data and the number of dots of the graph, the numeric data can be printed out by the bar graph correctly. In addition, the printer can print the graph by depressing the special key even in the non-print mode of the print mode key arranged on the desk top calculator.

What I claim is:

1. Electronic equipment with a printer, comprising:
    input means for inputting numeric data into said equipment;
    instruction means for producing an instruction signal that instructs graphic printing based on the numeric data input into said equipment by said input means;
    converting means responsive to the instruction signal produced by said instruction means for iteratively converting the numeric data input by said input means to a bar graph pattern which represents the numeric data, which iterations form separate complete groups of a predetermined number of dots indicating a predetermined plural number, respectively, a final iteration forming an incomplete group of dots indicating a number less than the predetermined plural number; and
    print means for printing the bar graph pattern to which the input numeric data is converted by said converting means.

2. Electronic equipment with a printer, comprising:
    input means for inputting numeric data into said equipment;
    instruction means for producing an instruction signal that instructs graphic printing based on the numeric data input into said equipment by said input means;
    converting means responsive to the instruction signal produced by said instruction means for iteratively converting the numeric data input by said input means to a bar graph pattern that comprises respectively separate plural groups of dots representing the numeric data, the total number of dots of the bar graph pattern being a product of the numeric data input by said input means and a predetermined integer; and
    print means for printing said bar graph pattern to which the input data is converted by said converting means.

3. Electronic equipment with a printer, comprising:
    input means for inputting numeric data into said equipment;
    instruction means for producing an instruction signal that instructs graphic printing based on the numeric data input means;
    converting means responsive to the instruction signal produced by said instruction means for iteratively converting the numeric data input by said input means to a bar graph pattern which indicates the numeric data, which iterations form separate complete groups of a predetermined number of dots indicating a predetermined plural number, respectively, a final iteration forming an incomplete group of dots indicating a number less than the predetermined plural number, the total number of dots of the bar graph pattern being a product of the numeric data and a predetermined integer; and
    print means for printing said bar graph pattern to which the input data is converted by said converting means.

4. Electronic equipment with a printer according to claim 3, further comprising:
    display means for displaying the numeric data input to said equipment by said input means.

5. Electronic equipment with a printer according to claim 3, wherein said input means includes a plurality of numeric keys.

6. Electronic equipment with a printer according to claim 3, wherein said converting means includes a character generator for generating the bar graph pattern having a number of dots corresponding to said numeric data.

7. Electronic equipment with a printer according to claim 3, wherein said print means includes a thermal print head having a plurality of heat generating elements being heated to print the bar graph pattern, said heat generating elements corresponding to the bar graph pattern of the input numeric data as converted by said converting means.

8. Electronic equipment with a printer comprising:
    input means for inputting numeric data and functions for operating on the numeric data into said equipment;
    arithmetic operation means for carrying out arithmetic operations on the numeric data on the basis of the functions input into said equipment by said input means and for producing an operation result therefrom;
    instructions means for producing an instruction signal that instructs graphic printing of the operation result produced by said arithmetic operating means;
    converting means responsive to the instruction signal produced by said instruction means for iteratively converting the operation result to a bar graph pattern which indicates the operation result, which iterations form separate complete groups of a predetermined number of dots indicating a predetermined plural number, respectively, a final iteration forming an incomplete group of dots indicating a number less than the predetermined plural number; and
    print means for printing the bar graph pattern to which the operation result is converted by said converting means.

9. Electronic equipment with a printer, comprising:
    input means for inputting numeric data and functions for operating on the numeric data into said equipment;
    arithmetic operation means for carrying out arithmetic operations on the numeric data on the basis of the functions input into said equipment by said input means and for producing an operation result therefrom;
    instruction means for producing an instruction signal that instructs graphic printing of the operation result produced by said arithmetic operation means;
    converting means responsive to the instruction signal produced by said instruction means for iteratively converting the operation result to a bar graph pattern that comprises respectively separate plural groups of dots representing the operation result, the total number of dots of the bar graph pattern being a product of the operation result of said arithmetic operation means and a predetermined integer; and
    print means for printing the bar graph pattern to which the operation result is converted by said converting means.

10. Electronic equipment with a printer, comprising:

input means, for inputting numeric data and functions for operating on the numeric data into said equipment;

arithmetic operation means for carrying out arithmetic operations on the numeric data on the basis of the functions input into said equipment by said input means and for producing an operation result therefrom;

instruction means for producing an instruction signal that instructs graphic printing of the operation result produced by said arithmetic operation means;

converting means responsive to the instruction signal produced by said instruction means for iteratively converting the operation result to a bar graph pattern which indicates the numeric data, which iterations form separate complete groups of a predetermined number of dots indicating a predetermined plural number, respectively, a final iteration forming an incomplete group of dots indicating a number less than the predetermined plural number, the total number of dots of the bar graph pattern being a product of the operation result and a predetermined integer; and print means for printing the bar graph pattern to which the operation result is converted by said converting means.

11. Electronic equipment with a printer according to claim 10, further comprising:

display means for displaying the numeric data input by said input means and the operation result produced by said arithmetic operation means.

12. Electronic equipment with a printer according to claim 10, wherein said input means includes a plurality of numeric keys and a plurality of function keys.

13. Electronic equipment with a printer according to claim 10 wherein said converting means includes a character generator for generating the bar graph pattern having a number of dots corresponding to said operation result produced by said arithmetic operation means.

14. Electronic equipment with a printer according to claim 10 wherein said print means includes a thermal print head having a plurality of heat generating elements for printing the bar graph pattern, said heat generating elements corresponding to the bar graph pattern to which the operation result is converted by said converting means.

15. Electronic equipment with a printer, comprising:

input means for inputting numeric data and functions for operating on the numeric data into said equipment;

arithmetic operation means for carrying out arithmetic operations on the numeric data on the basis of the functions input into the equipment by said input means and for producing an operation result therefrom;

instruction means for producing an instruction signal that instructs graphic printing of at least one of the numeric data input by said input means and the operation result produced by said arithmetic operation means;

converting means responsive to the instruction signal produced by said instruction means for iteratively converting the one of the numeric data and the operation result instructed by said instruction means to a bar graph pattern which represents the one of the numeric data and the operation result, which iterations form separate complete groups of a predetermined number of dots indicating predetermined plural number, respectively, a final iteration forming an incomplete group of dots indicating a number less than the predetermined plural number; and print means for printing the numeric printing pattern and the graphic printing pattern corresponding to the one of the numeric data and the operation result produced by said converting means.

16. Electronic equipment with a printer according to claim 15, wherein said print means prints the bar graph pattern and the numeric printing pattern representing the same value adjacent each other.

17. Electronic equipment with a printer, comprising:

input means for inputting numeric data and functions for operating on the numeric data into said equipment;

arithmetic operation means for carrying out arithmetic operations on the numeric data on the basis of functions input into the equipment by said input means and for producing an operation result therefrom;

instruction means for producing an instruction signal that instructs graphic printing of at least one of the numeric data input by said input means and the operation result produced by said arithmetic operation means;

converting means responsive to the instruction signal produced by said instruction means for iteratively converting the one of the numeric data and the operation result instructed by said instruction means to a bar graph pattern that comprises respectively separate plural groups of dots indicating the one of the numeric data and the operation result, the total number of dots of the bar graph pattern being a product of a predetermined integer and the one of the numeric data and the operation result; and print means for printing the numeric printing pattern and the bar graph pattern corresponding to the one of the numeric data and the operation result produced by said converting means.

18. Electronic equipment with a printer according to claim 17, wherein said print means prints the bar graph pattern and the numeric printing pattern representing the same value adjacent each other.

19. Electronic equipment with a printer, comprising:

input means for inputting numeric data and functions for operating on the numeric data into said equipment;

arithmetic operation means for carrying out arithmetic operations on the numeric data on the basis of the functions input into said equipment by said input means;

instruction means for producing an instruction signal that instructs graphic printing of at least one of the numeric data input by said input means and the operation result produced by said arithmetic operation means;

converting means responsive to the instruction signal produced by said instruction means for iteratively converting the one of the numeric data and said operation result instructed by said instruction means to a bar graph pattern which represents the one of the numeric data and the operation result, which iterations form separate complete groups of a predetermined number of dots indicating a predetermined plural number, respectively, a final iteration forming an incomplete group of dots indicating a number less than the predetermined plural number, the total number of dots of the bar graph pattern being a product of the one of the numeric data and the operation result and a predetermined integer, said converting means also converting the one of the numeric data and the operation result to a numeric printing pattern representing the same value as that represented by the bar graph pattern and corresponding to the same one of the numeric data and the operation result; and print means for printing, adjacent each other, the numeric printing pattern and the graphic printing pattern of the one of the numeric data and the operation result produced by said converting means.

20. Electronic equipment with a printer according to claim 19, further comprising:
display means for displaying the numeric data input by said input means and the operation result produced by said arithmetic operation means.

21. Electronic equipment with a printer according to claim 19, wherein said input means includes a plurality of numeric keys and a plurality of function keys.

22. Electronic equipment with a printer according to claim 19, wherein said converting means includes a character generator for generating the bar graph pattern having a number of dots corresponding to the one of the numeric data and the operation result, and the numeric printing pattern for the one of the numeric data and the operation result.

23. Electronic equipment with a printer according to claim 19, wherein said print means includes a thermal print head having a plurality of heat generating elements being heated to print the bar graph pattern and the numeric printing pattern, said heat generating elements corresponding respectively to the one of the numeric pattern and the operation result produced by said converting means and the bar graph pattern of the one of the numeric data and the operation result produced by said converting means.

24. Electronic equipment with a printer, comprising:
input means for inputting numeric data into said equipment;
code number specifying means for specifying a code number corresponding to the numeric data input into said equipment by said input means;
graphic printing instruction means for producing an instruction signal that instructs graphic printing of the numeric data input by said input means and for which a code number has been specified by said code number specifying means;
converting means for converting the code number specified by said code number specifying means to a numeric pattern corresponding to said numeric data and responsive to the instruction signal produced by said graphic printing instruction means for iteratively converting said numeric data for which an instruction signal has been produced by said graphic printing instruction means to a bar graph pattern which represents the numeric data, which iterations form separate complete groups of a predetermined number of dots indicating a predetermined plural number, respectively, a final iteration forming an incomplete group of dots indicating a number less than the predetermined plural number, the total number of the dots of the bar graph pattern being a product of the numeric data and a predetermined integer; and print means for printing said numeric pattern and said bar graph printing pattern produced by said converting means adjacent each other.

25. Electronic equipment with a printer according to claim 24, wherein said input means includes a plurality of numeric keys.

26. Electronic equipment with a printer according to claim 24, wherein said converting means includes a character generator for generating the numeric pattern corresponding to said numeric data for which a code number has been specified by said code number specifying means, and the bar graph pattern corresponding to the numeric data for which an instruction signal has been produced by said graphic printing instruction means.

27. Electronic equipment with a printer according to claim 24, wherein said print means includes a thermal print head having a plurality of heat generating elements, for being heated to print the numeric pattern and the bar graph pattern, said heat generating elements corresponding to said numeric pattern and the bar graph pattern produced by said converting means.

28. Electronic equipment with a printer, comprising:
input means for inputting numeric data into said equipment;
code number specifying means for specifying a code number corresponding to the numeric data input into said equipment by said input means;
graphic printing instruction means for producing an instruction signal that instructs graphic printing of the numeric data input by said input means and for which a code number has been specified by said code number specifying means;
converting means for converting the code number specified by said code number specifying means to a numeric pattern corresponding to said numeric data and responsive to the instruction signal produced by said graphic printing instruction means for iteratively converting said numeric data for which an instruction signal has been produced by said graphic printing instruction means to a bar graph pattern which represents the numeric data, which iterations form separate complete groups of a predetermined number of dots indicating a predetermined plural number, respectively, a final iteration forming an incomplete group of dots indicating a number less than the predetermined plural number, the total number of the dots of the bar graph pattern being identical with a value represented by the bar graph pattern; and print means for printing said numeric pattern and said bar graph pattern produced by said converting means adjacent each other.

29. Electronic equipment with a printer according to claim 28, wherein said input means includes a plurality of numeric keys.

30. Electronic equipment with a printer according to claim 28, wherein said converting means includes a character generator for generating the numeric pattern corresponding to said numeric data for which a code number is specified by said code number specifying means and the bar graph pattern corresponding to the numeric data for which an instruction signal has been produced by said graphic printing instruction means.

31. Electronic equipment with a printer according to claim 28, wherein said print means includes a thermal print head having a plurality of heat generating elements for being heated to print the numeric pattern and the bar graph pattern, the said heat generating elements corresponding to the numeric pattern and the bar graph printing pattern produced by said converting means.

* * * * *

UNITED STATES PATENT AND TRADEMARK OFFICE
CERTIFICATE OF CORRECTION

PATENT NO. : 4,843,591

DATED : June 27, 1989

INVENTOR(S) : Shigeru Toyomura

It is certified that error appears in the above-identified patent and that said Letters Patent is hereby corrected as shown below:

Figure 7A
    At step S61, change "PUSE" to --PULSE--.

COLUMN 1
    Line 31, delete "an" (second occurrence).
    Line 40, change "in" to --a--.
    Line 43, delete "an".

COLUMN 2
    Line 16, change "2 dots." to --2 dots from the "0".--.
    Line 26, change "tion" to --tions--.
    Line 31, change "keying operations [2], " to --keying operations [2], [3], [g]--.
    Line 59, change "key" to --key [N]--.
    Line 60, change "keys , , [g]," to --keys [6], [4], [g], --.

UNITED STATES PATENT AND TRADEMARK OFFICE
CERTIFICATE OF CORRECTION

PATENT NO. : 4,843,591

DATED : June 27, 1989

INVENTOR(S) : Shigeru Toyomura

It is certified that error appears in the above-identified patent and that said Letters Patent is hereby corrected as shown below:

COLUMN 3
    Line 13, change "[=]," to --,[=]--.

COLUMN 4
    Line 31, change "space to" to --space for--.
    Line 45, change "space to" to --space for--.

COLUMN 5
    Line 25, change "transmit" to --transmits--.
    Line 31, change "numeric key [5]" to --numeric key [5]--.
    Line 64, change "key [g]" to --key [g]--.

COLUMN 6
    Line 58, change "are" to --is--.

COLUMN 8
    Line 25, change "instructions means" to --instruction means--.

UNITED STATES PATENT AND TRADEMARK OFFICE
CERTIFICATE OF CORRECTION

PATENT NO. : 4,843,591
DATED : June 27, 1989
INVENTOR(S) : Shigeru Toyomura

It is certified that error appears in the above-identified patent and that said Letters Patent is hereby corrected as shown below:

COLUMN 9
    Line 37, change "claim 10" to --claim 10,--.
    Line 43, change "claim 10" to --claim 10,--.

COLUMN 10
    Line 2, change "indicating prede-" to --indicating a piede--.

Signed and Sealed this

Seventeenth Day of July, 1990

Attest:

HARRY F. MANBECK, JR.

Attesting Officer     Commissioner of Patents and Trademarks